H. EISELE.
DEVICE FOR QUARTERING DRIVING WHEELS OF LOCOMOTIVES.
APPLICATION FILED FEB. 28, 1919. RENEWED MAY 9, 1921.

1,387,533.

Patented Aug. 16, 1921.
2 SHEETS—SHEET 1.

Witnesses:
Robert F. Weir
Arthur W. Carling

Inventor
Henry Eisele
by Foxie Bain & Bean
Attys.

H. EISELE.
DEVICE FOR QUARTERING DRIVING WHEELS OF LOCOMOTIVES.
APPLICATION FILED FEB. 28, 1919. RENEWED MAY 9, 1921.
1,387,533.
Patented Aug. 16, 1921.
2 SHEETS—SHEET 2.
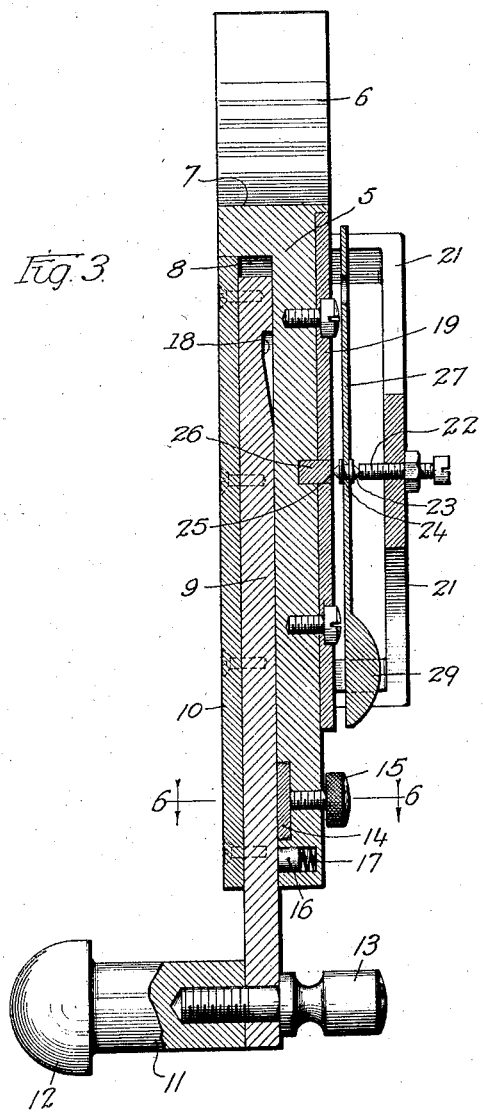
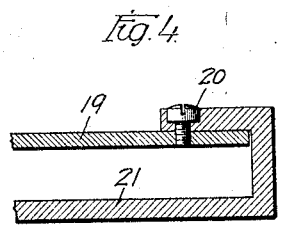
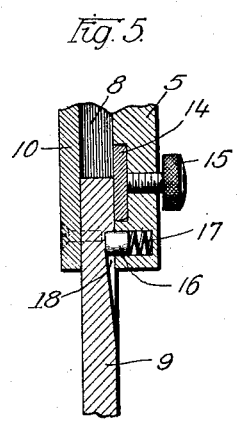
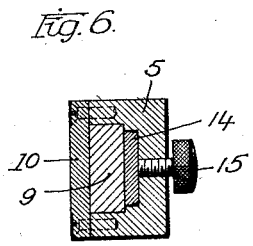
Witnesses:
Inventor
Henry Eisele
by Foxe Bain + Bean.
Attys:

UNITED STATES PATENT OFFICE.

HENRY EISELE, OF DECATUR, ILLINOIS.

DEVICE FOR QUARTERING DRIVING-WHEELS OF LOCOMOTIVES.

1,387,533.   Specification of Letters Patent.   Patented Aug. 16, 1921.

Application filed February 28, 1919, Serial No. 279,810. Renewed May 9, 1921. Serial No. 467,932.

*To all whom it may concern:*

Be it known that I, HENRY EISELE, a citizen of the United States, residing at Decatur, in the county of Macon and State of Illinois, have invented certain new and useful Improvements in Devices for Quartering Driving-Wheels of Locomotives, of which the following is a specification.

This invention relates to improvements in devices for quartering driving wheels of locomotives and the like and the principal object of this invention is to provide such a device whereby the relative angular position of the crank of the drive wheels of locomotives is quickly, readily, and accurately determined.

In the construction and operation of locomotives, it is necessary and desirable that the cranks on the opposite drive wheels be disposed at an angle of 90 degrees in reference to each other, that is "quartered," and it is necessary for proper efficiency and operation to maintain these cranks at this angle relative to each other.

Heretofore it has been customary to determine the relative angular position of the opposite cranks by means of intricate mathematical calculation and also leveling and plumbing, and with the expenditure of a considerable amount of time of a skilled engineer or mechanic. It is to overcome the necessity of extended calculation and measurement that I evolved the device shown in the drawings and hereinafter described, whereby the relative angular position of the opposite cranks may be quickly, readily and accurately determined, resulting obviously in a material decrease in the expense of performing the operation of "quartering" the driving wheels.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood however that various changes may be made in practice within the scope of the claims without digressing from my inventive idea.

In the drawings—

Fig. 3 is a vertical longitudinal section taken substantially on line 3—3 of Fig. 2.

Fig. 4 is a detailed cross section taken substantially on line 4—4 of Fig. 2.

Fig. 5 is a sectional view illustrating a detail.

Fig. 6 is a transverse cross section taken substantially on line 6—6 of Fig. 3.

Figure 1:
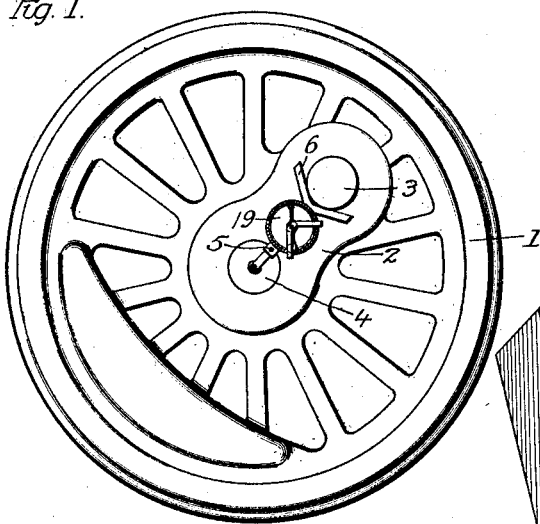
Figure 1 represents the elevational view of a locomotive drive wheel with a device constructed according to my invention shown in use.

Referring first to Fig. 1 the numeral 1 designates the drive wheel having the crank 2, the crank pin 3, 4 designating the axle, having the usual center hole. In the case of locomotives the cranks on the opposite wheels are maintained at an angle of 90 degrees relative to each other and this relative position may be disturbed through wear and tear of operation and my device will quickly indicate whether or not the wheels are properly positioned. This is also true in the case of renewing the axle and in pressing on the drive wheel.

The numeral 5 designates the main body member which is elongated, and provided at its end with the yoke forked or V-shaped member 6 having the curve 7 at their junction which is adapted to fit the crank pin 3. This member 5 is recessed longitudinally, as at 8, to receive the slidable or telescopic arm member 9, the cap plate 10 being utilized to hold the same slidably in position. This arm 9 is provided at one end with the engaging member 11 having the ball head 12 which is adapted to fit in the center hole in the end of the axle. This end of the arm 9 is also provided with the manipulating handle 13. As stated before, this arm 9 is slidable relative to the member 5 and is held in various adjusted positions by means of the friction block 14 and set screw 15, and is prevented from being pulled entirely out of the member 9 by means of the lock plunger 16 adapted to be forced by spring 17 into the locking notch 18 when the arm reaches the outer limit of movement. It is therefore seen that provision has been made for the adjustment of this device to wheels having different lifts or strokes.

Mounted on the front face of member 5 and secured thereto by screws 19′ is the circular dial 19 which may be graduated in a number of ways. In the form shown, the graduation starts with zero and runs to 90 and then extends to zero again, two series of such graduations being provided so that the dial is divided into quadrants of 90 degrees each.

The pointer supporting frame is attached to the under side of the dial 19, as at 20, being formed with two arms 21 for that purpose. These arms are spaced above the dial 19 and merge into each other or are connected together over the center of the dial and receive the locking set screw 22 having a tapered recess in its inner end to receive the tapered point 23 of the pivot pin 24. The other end of this pivot pin 24 is tapered, as at 25, to fit in a corresponding recess in the bearing block 26. The pointer 27 is connected to the pivot pin 24 and has the indicating end 28 and the weighted end 29, whereby due to gravitation, the pointer is always held in a vertical position, the weighted end 29 at the bottom and the indicating end 28 at the top. The frame 21 is spaced a sufficient distance from the dial 19 to permit the pointer to have its necessary rotary movement above its pivot.

Figure 2:
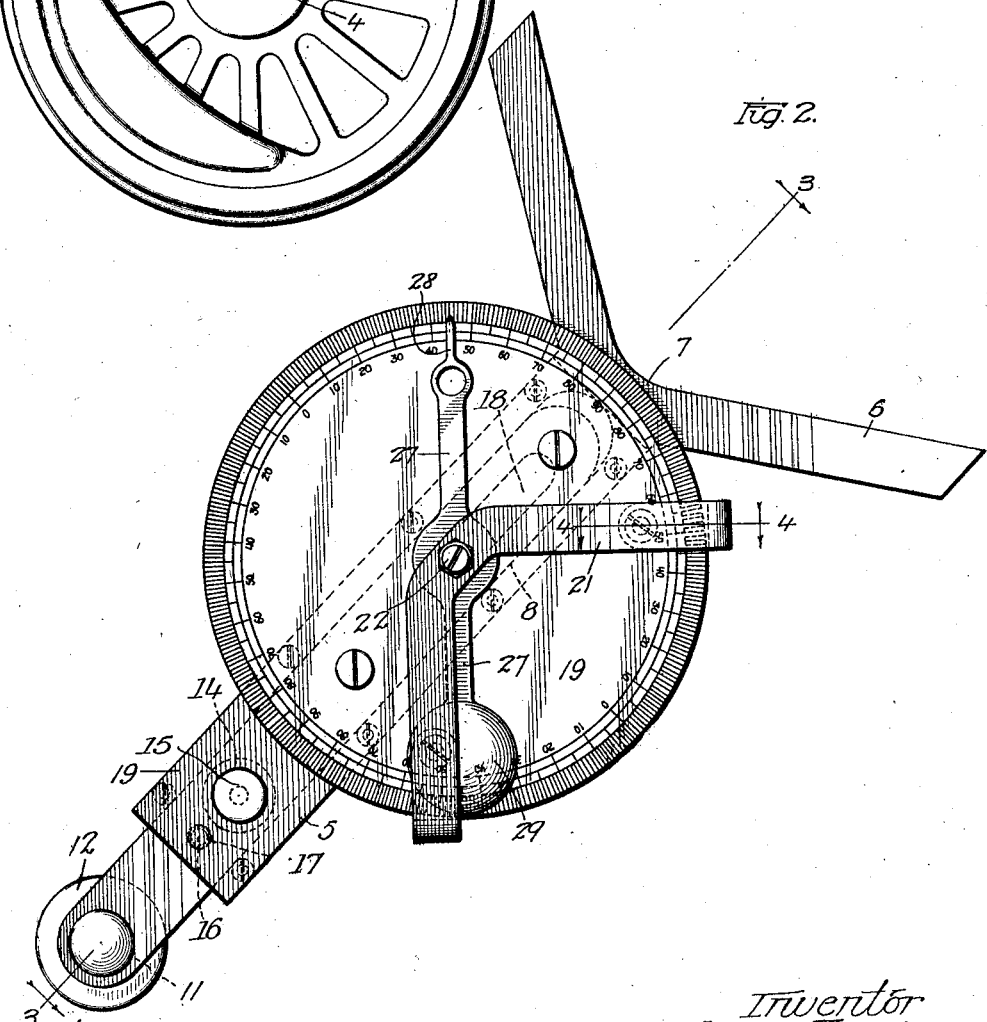
Fig. 2 is an enlarged front elevation of a device constructed according to my invention.

The manner of use of this device is as follows:—The extensible arm 9 is moved so that the ball head 12 will fit in the center hole of the axle and the curved part 7 of the forked end 6 of the device fits against the crank pin. The pointer will then swing so that the indicating end thereof will make a suitable indication, such as shown at Fig. 2 of the drawing, the reading being 45 degrees. The device is then removed and positioned on the opposite drive wheel and a similar reading made. If this second reading is also 45 degrees, it indicates that the crank arms are 90 degrees apart, that is in relation to their angular position and that they are therefore properly "quartered." Of course, if the indication is different, proper correction can be made in various ways.

While I have described this device as being particularly adapted to quartering drive wheels of locomotives, it is obvious that it is capable of use in various other capacities.

Having described my invention, what I claim is:—

1. A device of the character described, including, in combination, an extensible bar having a fork at one end adapted to engage a pin and having a knob at the other end adapted to fit in a hole, a dial secured to said bar intermediate said fork and knob and having indications thereon, and a weighted pointer pivotally mounted on said dial and adapted to register with the indications thereon.

2. A device of the character described, including, in combination, an extensible bar member having engaging means at each end, a dial secured to said bar member between said engaging means and having indications thereon, a frame secured to the dial spaced from the indicating face thereof and extending over the center thereof, a pivot member having a bearing in said frame and said dial, and a weighted pointer secured to said pivot member.

3. A device of the character described, including, in combination, a main member having a fork at one end adapted to engage a pin, an arm extensible relative to said main member and having a knob adapted to engage a hole, a dial secured to said main member between said fork and knob, and a weighted pointer pivoted so as to move over the face of said dial.

4. A device of the character described adapted to "quarter" drive wheels of locomotives, including, in combination, a member having a fork at one end adapted to engage the crank pin, a bar having a knob on its end adapted to engage the center hole of the axle, said bar being extensible relative to said member, means for holding said parts in adjusted position, a dial secured to said member between said fork and knob, and a weighted pointer pivoted to swing over the face of said dial.

5. A device of the character described adapted to "quarter" drive wheels of locomotives, including, in combination, a member having a fork at one end adapted to engage the crank pin, a bar having a knob on its end adapted to engage the center hole of the axle, said bar being extensible relative to said member, means for holding said parts in adjusted position, a dial secured to said member between said fork and knob, a frame secured to said dial, spaced from the outer face thereof and extending over the center thereof, a pivot member having a bearing in said frame and said dial, and a weighted pointer secured to said pivot member so as to swing over the face of said dial.

6. A device of the character described including in combination a main bar member having a fork at one end adapted to engage a crank pin, said main bar member being recessed and having an additional bar member slidingly positioned in said recess, means in said main bar member and engaging said additional bar member for securing the same in adjusted positions and means for preventing the removal of said additional bar member from the recess in said main bar member, said additional bar member having a ball head on its end adapted to fit the center hole of an axle, a dial secured to said main bar member between said ball and the other end of the bar member, a frame secured to said dial having a part thereof positioned over the center of the dial and spaced therefrom, a bearing screw positioned in said part of said frame, a pivot member having a bearing in said screw and in said dial, and a weighted pointer secured to said pivot member and adapted to swing across the face of said dial.

7. A device of the character described having in combination an axially extensible frame providing two members, one member having on its outer end a fork for engagement with the wrist pin of a locomotive drive wheel; the other member having on its outer end a laterally projecting stem to enter the centering cavity at the axle of the wheel; means to hold the members in adjusted position; a dial on the member having the forked end, near the middle thereof; a weighted, pivoted pointer supported on the dial near its axis and means to prevent separation of the two frame members.

In testimony whereof I hereunto subscribe my name.

HENRY EISELE.